No. 884,676.   
PATENTED APR. 14, 1908.  
M. L. McCLURE.  
CULTIVATOR ATTACHMENT.  
APPLICATION FILED NOV. 13, 1907.

Witnesses

Inventor  
M. L. McClure

By ......., Attorneys

UNITED STATES PATENT OFFICE.

MARSHAL L. McCLURE, OF REPUBLIC, MISSOURI.

CULTIVATOR ATTACHMENT.

No. 884,676.

Specification of Letters Patent.

Patented April 14, 1908.

Application filed November 13, 1907. Serial No. 401,992.

*To all whom it may concern:*

Be it known that I, MARSHAL L. McCLURE, a citizen of the United States, residing at Republic, in the county of Greene and State of Missouri, have invented certain new and useful Improvements in Cultivator Attachments, of which the following is a specification.

Before planting seed it is necessary to prepare the soil first by plowing and subsequently by harrowing, both to level and pulverize the soil. The present invention provides means to be attached to a planter for preparing the soil in advance of dropping the seed, and which will take the place of the accustomed harrowing operation, thereby saving time, labor and expense.

In its specific construction, the attachment consists of a framework fitted to the runner frame of a planter and cultivator teeth mounted upon said framework and adjustable so as to secure the best results and enable the teeth to penetrate the surface of the soil to any desired depth.

For a full understanding of the invention and the merits thereof and also to acquire a knowledge of the details of construction and the means for effecting the result, reference is to be had to the following description and accompanying drawings.

Figure 1:
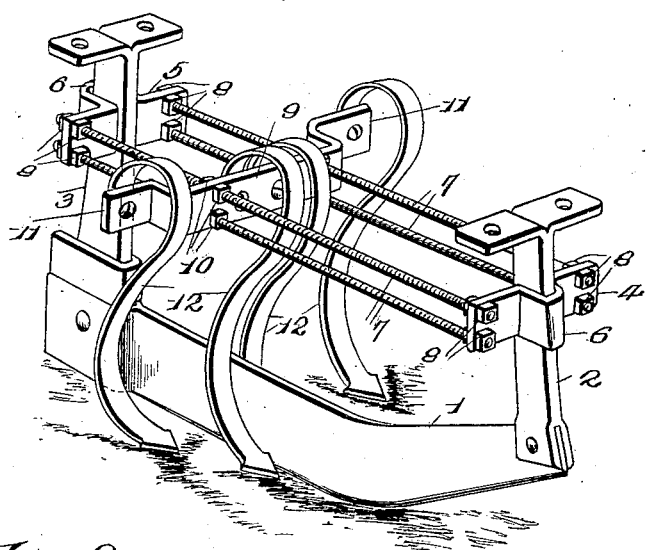
Figure 2:
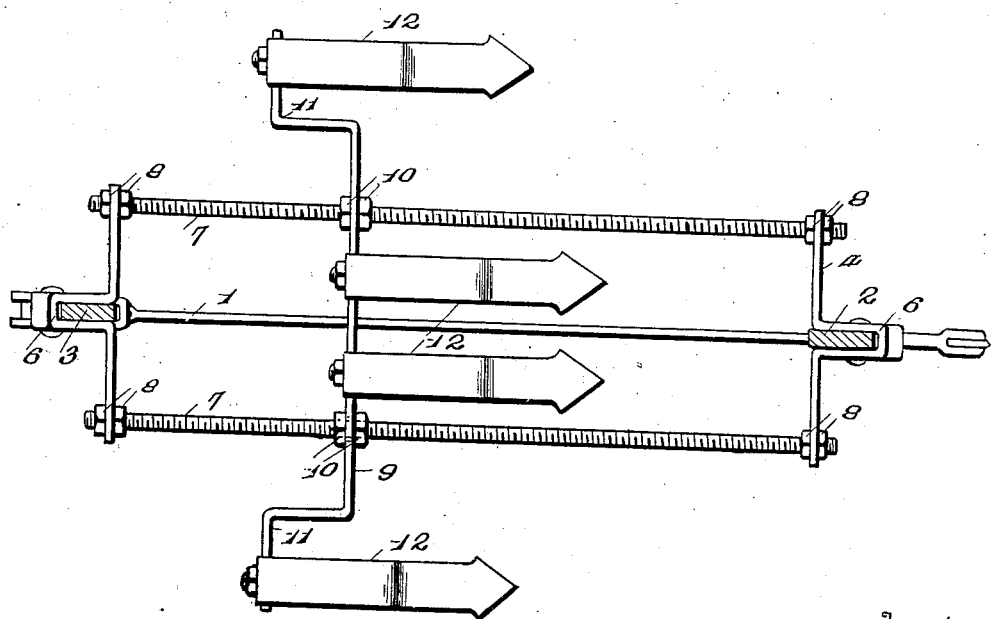

While the invention may be adapted to different forms and conditions by changes in the structure and minor details without departing from the spirit or essential features thereof, still the preferred embodiment is shown in the accompanying drawings, in which:

Figure 1 is a perspective view of the runner of a planter equipped with the cultivator attachment embodying the invention. Fig. 2 is a top plan view of the parts shown in Fig. 1, the apparatus of the runner being in section.

The present invention is applicable to planters of the type having runners operating in advance of the boots or tubes by means of which the grain is conveyed into trenches or furrows open by means of the runners. Each runner is provided with an attachment, hence one runner and a single attachment only are illustrated in the accompanying drawings. The runner 1 is provided with uprights or standards 2 and 3 which are adapted to be secured in any manner at their upper ends to the frame of the planter, not shown. The attachment consists of similar front and rear cross bars 4 and 5 which are provided intermediate of their ends with loops 6 to embrace three sides of the respective uprights or standards. Pairs of tie rods 7 connect corresponding end portions of the cross bars 4 and 5 and are vertically spaced and have their end portions passed through openings formed in the end portions of the said cross bars. The tie rods 7 are threaded throughout their length and their end portions receive pairs of set nuts 8 between which the end portions of the cross bars 4 and 5 are clamped. By drawing the end portions of the cross bars 4 and 5 inward, the open ends of the loops 6 are caused to contract, with the result that opposite side portions of said loops are caused to grip opposite sides of the uprights or standards 2 and 3 and thereby secure the framework of the attachment in the required adjusted position. While the cross bars 4 and 5 are stout and sufficiently strong to provide a substantial and stable framework, they, nevertheless, possess a degree of resiliency to admit of the loops 6 contracting to cause their sides to bind against the adjacent sides of the uprights upon subjecting the end portions of said cross bars to sufficient tension, which is effected by proper adjustment of the set nuts 8.

A cross bar 9 is mounted upon the pair of tie rods 7 and is provided with openings for said tie rods to pass through, the openings being of a size to clear the threads of the tie rods so that the cross bar may move freely thereon. Pairs of set nuts 10 are mounted upon each of the tie rods 7 to secure the cross bar 9 in the adjusted positon. Off-sets 11 are provided near the outer ends of the cross bar to throw the terminal portions thereof in the rear of the metal portion, whereby the cultivator teeth at each side of the runner may have a progressive arrangement. The cross bar 9 forms a support for the cultivator teeth 12, which are bolted or otherwise fastened thereto. The cultivator teeth may be of any type such as commonly employed for tilling or cultivating the soil. As shown, the cultivator teeth are approximately of S-form and possessed of spring action so as to yield when meeting with an obstruction so as to prevent abnormal strain or disabling of the mechanism. Any desired number of teeth may be employed and the same are arranged upon opposite sides of the runner 1 and are spaced apart to insure a thorough tilling of the soil in advance of dropping the seed, whereby the best results possible may be obtained.

From the foregoing it will be understood that a planter equipped with an attachment embodying the invention, when advanced over a plowed field, prepares the soil for reception of the grain and at the same time deposits the latter in the soil, thereby avoiding the time, expense and labor usually required for harrowing the soil after plowing and preliminary to planting. The framework of the attachment may be raised or lowered to regulate the depth to which the cultivator teeth may penetrate the soil by loosening the said nuts 8 and after said attachment has been adjusted to the required position, it may be secured by retightening the tie rod 7 by turning up the set nuts previously loosened.

Having thus described the invention, what is claimed as new is:

1. In combination, a runner provided with front and rear uprights, cross bars fitted to said uprights and having their end portions projected from opposite sides thereof, tie rods connecting the end portions of said cross bars, a bar adjustable upon the tie rods and projecting beyond the same upon opposite sides of the runner and having off-sets in its length, and cultivator teeth secured to said bar and arranged upon opposite sides of the runner in progressive formation.

2. In combination, a runner provided with front and rear uprights, cross bars having loops intermediate of their ends to embrace opposite sides of the respective uprights, tie rods connecting end portions of the cross bars and serving to contract the open sides of the loops to cause them to grip the said uprights, and a bar mounted upon the tie rods and provided with cultivator teeth.

In testimony whereof I affix my signature in presence of two witnesses.

MARSHAL L. McCLURE. [L. S.]

Witnesses:
   MARTIN L. HOWARD,
   W. L. O'BRYANT.